United States Patent [19]

Pallasvirta

[11] Patent Number: 4,925,010
[45] Date of Patent: May 15, 1990

[54] LOADING OF POURABLE GOODS

[75] Inventor: Jaakko T. Pallasvirta, Monheim, Fed. Rep. of Germany

[73] Assignee: Mannesmann AG, Duesseldorf, Fed. Rep. of Germany

[21] Appl. No.: 61,703

[22] Filed: Jun. 11, 1987

[30] Foreign Application Priority Data

Jun. 11, 1986 [DE] Fed. Rep. of Germany ....... 3619548

[51] Int. Cl.⁵ ............................................. B65G 15/26
[52] U.S. Cl. .................................. 198/588; 198/594; 414/140.9
[58] Field of Search ............ 198/594, 312, 314, 461.2, 198/588; 414/139, 139.4, 141.3, 140.8, 140.9, 133

[56] References Cited

U.S. PATENT DOCUMENTS 3,361,248 1/1968 Daymon ..................... 198/861.2 X
3,856,159 12/1974 Soros ................................... 414/139

FOREIGN PATENT DOCUMENTS 968984 3/1955 Fed. Rep. of Germany ...... 414/139
2516943 4/1975 Fed. Rep. of Germany ...... 414/139
2836469 8/1978 Fed. Rep. of Germany ...... 414/139
205862 1/1984 Fed. Rep. of Germany ...... 414/139
3332668 3/1985 Fed. Rep. of Germany ...... 414/139
240362 10/1986 Fed. Rep. of Germany ...... 198/314

Primary Examiner—Robert J. Spar
Assistant Examiner—Cheryl L. Gastineau
Attorney, Agent, or Firm—Ralf H. Siegemund

[57] ABSTRACT

A device for unloading and reloading includes a bridge with a first conveyer belt, the device being provided for delivering pourable goods to a destination along a quay and includes a tower for pivot-mounting the bridge; also sliding longitudinally on the tower one end of the bridge is provided for the discharge and transfer of goods from the first conveyer; a support carriage runs on rails along the quay; a carrier frame mounts that one end of the bridge to the carriage; and a depositing device with extended structure is pivoted about a vertical axis in an area of the frame mounting, and receives pourable goods from the first conveyer belt and delivers the goods for depositing by and at an end of the extended structure.

14 Claims, 4 Drawing Sheets

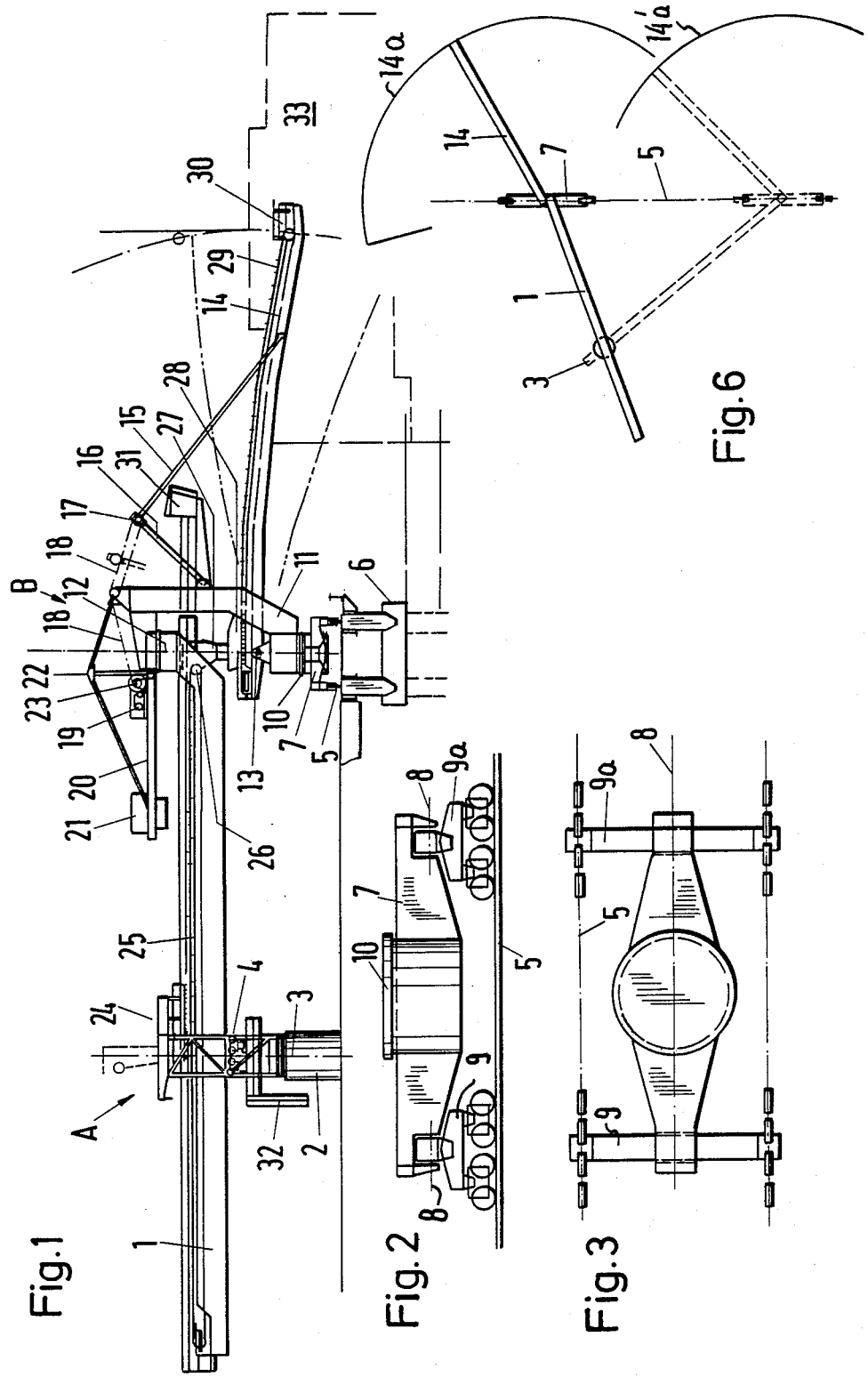

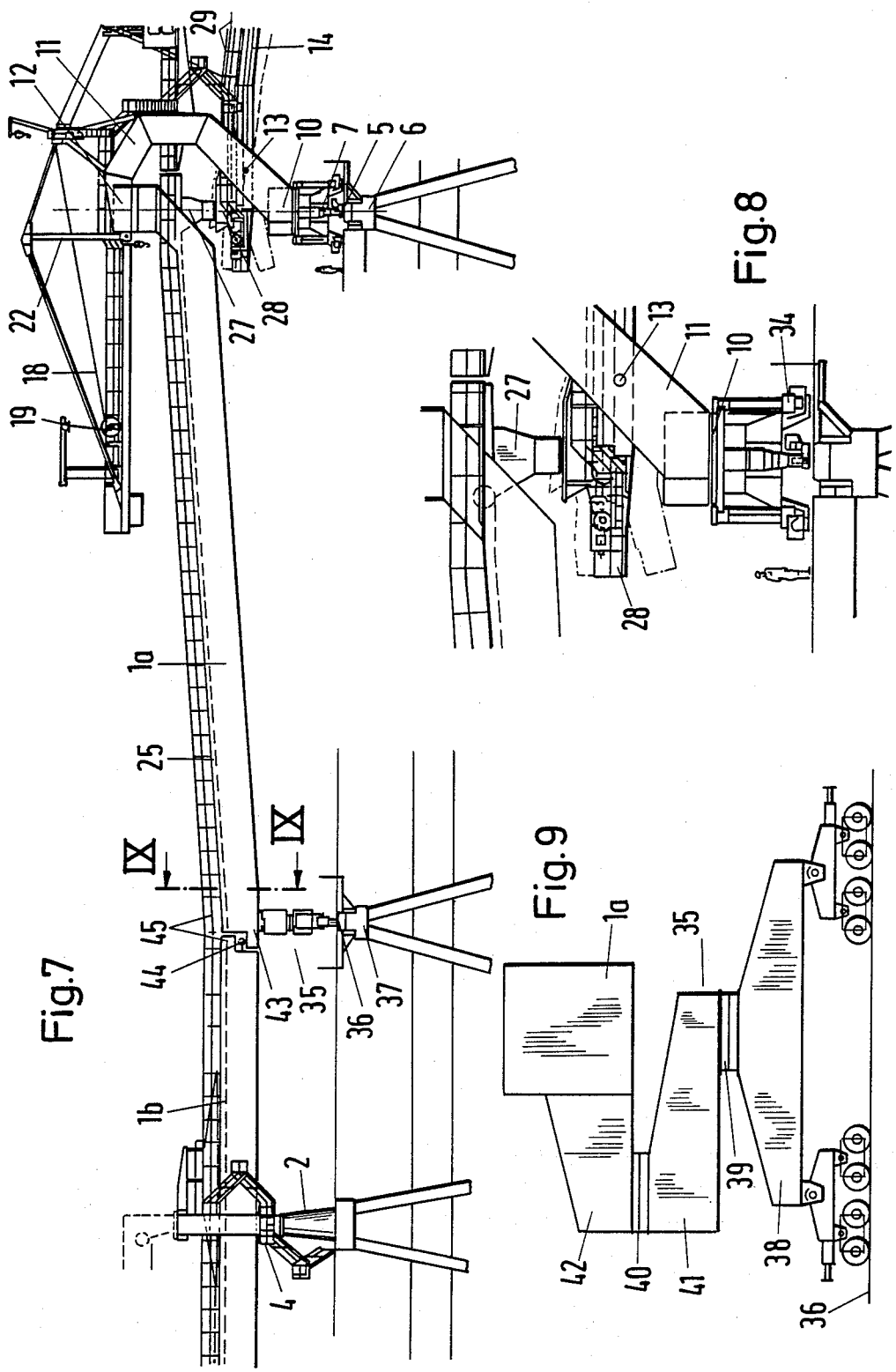

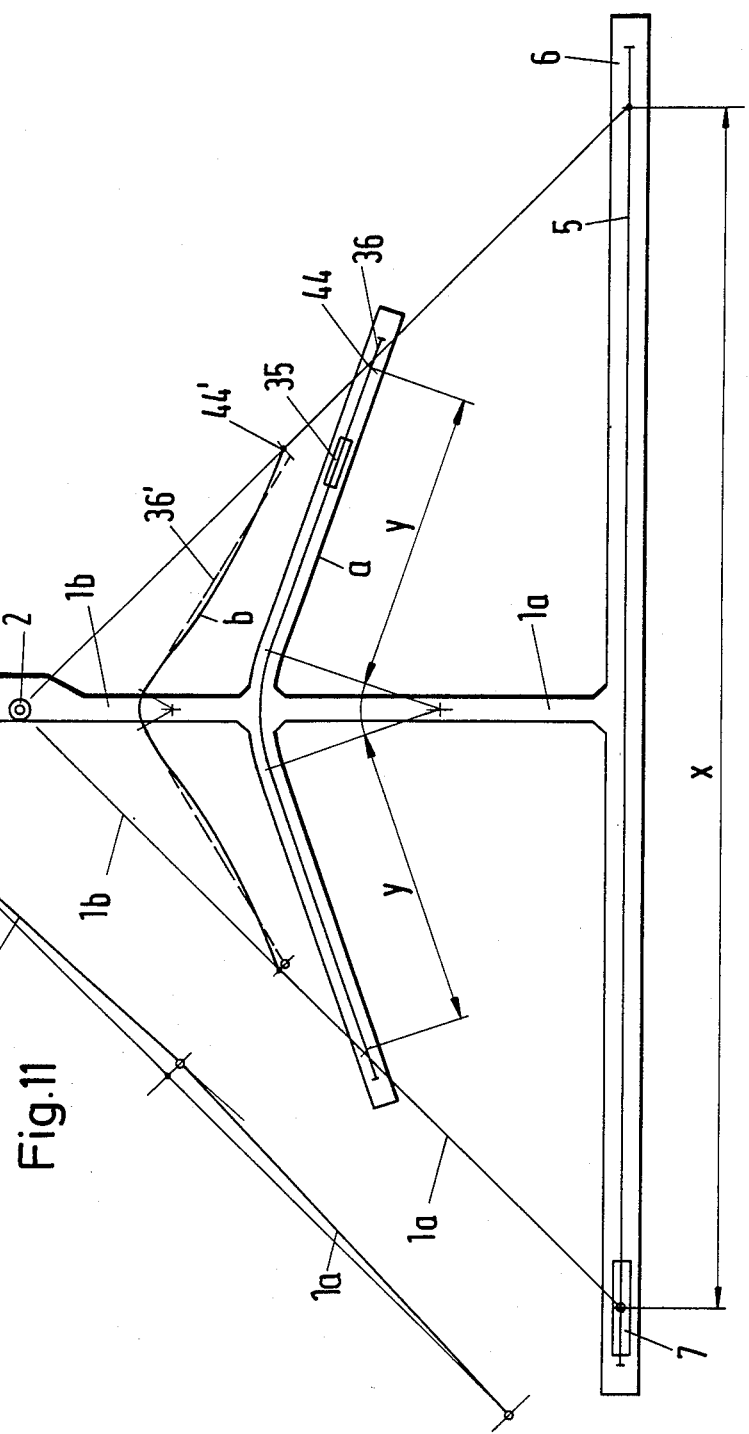

LOADING OF POURABLE GOODS

BACKGROUND OF THE INVENTION

The present invention relates to reloading, unloading or the like of pourable goods between e.g. a ship and dock storage facility, rail road car, truck or the like. Particularly the invention relates to a pourable goods transfer device that includes a bridge with conveyer belt; the bridge being (a) pivotable on a tower about a vertical axis as well as (b) movable e.g. along a quay to be moved towards a point of delivery or pick-up or both by means of a carriage.

A known device for loading, unloading and/or reloading pourable goods is shown in German printed patent application 21 53 359. Herein the construction is chosen so that the range of depositing and discharge of the goods essentially extends over the length of quay, pier or the like. Since ships differ greatly in length and since on the other hand ocean going vessels of the future become longer and longer, one has to consider this aspect very carefully upon planning loading and unloading facilities for pourable goods. Here one has to consider specifically that owing to the local conditions the pier wall may not have that particular length which is desired under a given set of circumstances such as a particular ship.

DESCRIPTION OF THE INVENTION

It is an object of the present invention to provide a new and improved device for loading, reloading and unloading pourable goods in such a fairly simple fashion that the delivery or depositing part for the ship or any other destination area can be considerably longer than actually covered by merely pivoting and transverse moving of the bridge or its carriage.

In accordance with the preferred embodiment of the present invention it is suggested to mount the discharge or transfer point of the bridge by means of a carrier frame onto the support carriage which carriage is thus provided underneath the discharge point of the bridge; a pivotable discharge and depositing device with an extended structure and conveyer belt is pivotably mounted on a vertical axis that extends from the discharge or transfer of the bridge, towards the final destination (e.g. a ship) of the pourable goods. The pivotable discharge and depositing device can be pivoted to cover directions in the longitudinal extension of the vessel, even after the bridge has itself reached the end of the quay. The ship actually can extend beyond the length of the pier for the length of this additional discharge equipment and device.

In furtherance of the invention the carrier frame should be provided with two slewing track rings for respectively pivotal mounting to the support carriage and the bridge. The frame may be of c-shaped configuration with two vertical posts having the load end of the depositing device between them. A cantilever beam of the frame mounts the slewing ring. A lever may be provided with counter weight and winch for a cable which engages a particular part of the extension of the discharge and depositing device which, in addition, is mounted by means of a pendulum shaft on the carrier frame.

The frame is preferably constructed in that a charge and discharge funnel is provided between two coaxially arranged slewing rings, the common axis being arranged underneath a deflection drum of the conveyer belt on the bridge and underneath the funnel is situated a loading device for the conveyer belt on the depositing device. This arrangement for transfer of pourable goods, particularly the structure in the range of coaxial slewing rings ensures that the transfer from one conveyer belt to the other is independent from the particular angular position of the delivery device and its ship ward extension. The carriage having the lower slewing ring of the carrier frame may be provided with longitudinal shaft and two under-carriages if there are two rails. The longitudinal shaft means can be dispensed with if there is a monorail arrangement. Tilting of the carriage is prevented by means of the carrier frame and by operation of the upper and lower slewing rings.

In order to facilitate the displacement of the bridge, roller bearings support the bridge on another carrier frame which in turn bears on another slewing ring on the stationary support tower; that slewing ring causes the principal pivoting of the bridge. In case of very large devices the bridge may be subdivided for reducing the bending moment; there being an inner or principal bridge part and an end or secondary part; these two parts support each other under utilization of extensions and support rollers. The two bridge parts are, in addition, supported by another carriage serving as intermediate support. A roller of that support establishes a hinged connection between the two bridge parts and permits limited deviations from a strict longitudinal alignment of the two bridge parts without interfering with the operation of the common conveyer belt so that it is not necessary to provide for a specific transfer of the goods from one bridge part to the other. The limited deflection of the bridge parts in relation to each other can be compensated for by the support of the conveyer belt. The intermediate support of the bridge connection is situated in the area between the tower and the, preferably, straight rails along the quay for the principal bridge supporting carriage. The second carriage runs on a rail in that in-between area. This rail will be curved and the ends are arranged toward the pier wall at such a distance therefore from corresponding to the length of the principal part of the bridge. This is a somewhat theoretical requirement and is not obtainable with absolute reliable precision. For this reason then the carriage of the intermediate support for the hinged bridge parts is provided with another slewing ring from which extends a length compensation lever for another slewing ring upon which bears the end of the principal part of the bridge by means of a laterally extending support lever. Length compensation lever and support lever can be of equal or unequal length. Owing to the slewing rings they change their position in relation to each other. Thus the relative position between the two rails or rail systems to each other does not have to be exact. This compensating feature is particularly important when the bridge is at right angles to the quay.

DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

FIG. 1 is a side elevation of a pourable goods reloading station constructed in accordance with the preferred embodiment of the present invention for providing the best mode thereof;

FIG. 2 illustrates in detail a side elevation of a support carriage shown in front view in FIG. 1 and on an enlarged scale;

FIG. 3 is a top elevation of the carriage shown in FIG. 2;

FIG. 6 illustrates schematically a pouring and delivering range covered by the equipment shown in FIG. 1;

FIG. 7 is a side view of another piece of equipment still within the purview of the preferred embodiment of the present invention;

FIG. 8 is a section as indicated by letter C in FIG. 7, also shown on an enlarged scale;

FIG. 9 is a section view indicated by IX—IX in FIG. 7;

FIG. 10 illustrates somewhat schematically the problem of tilting of bridge parts for a long divided bridge with intermediate support; and FIG. 11 illustrates the tilting problem on an enlarged scale.

Proceeding to the detailed description of the drawings, the figures particularly FIG. 1 illustrates a bridge 1 for supporting a conveyer belt 25. The bridge is mounted for turning on a tower 2. Mounting is accomplished in a two fold manner: a slewing track ring 3 is provided on the tower and permits turning of a bridge supporting frame 32 about a vertical axis. In addition, rollers 4 mount the bridges on fame 32 such that the bridge can move in longitudinal direction relative to the tower.

Figure 5:
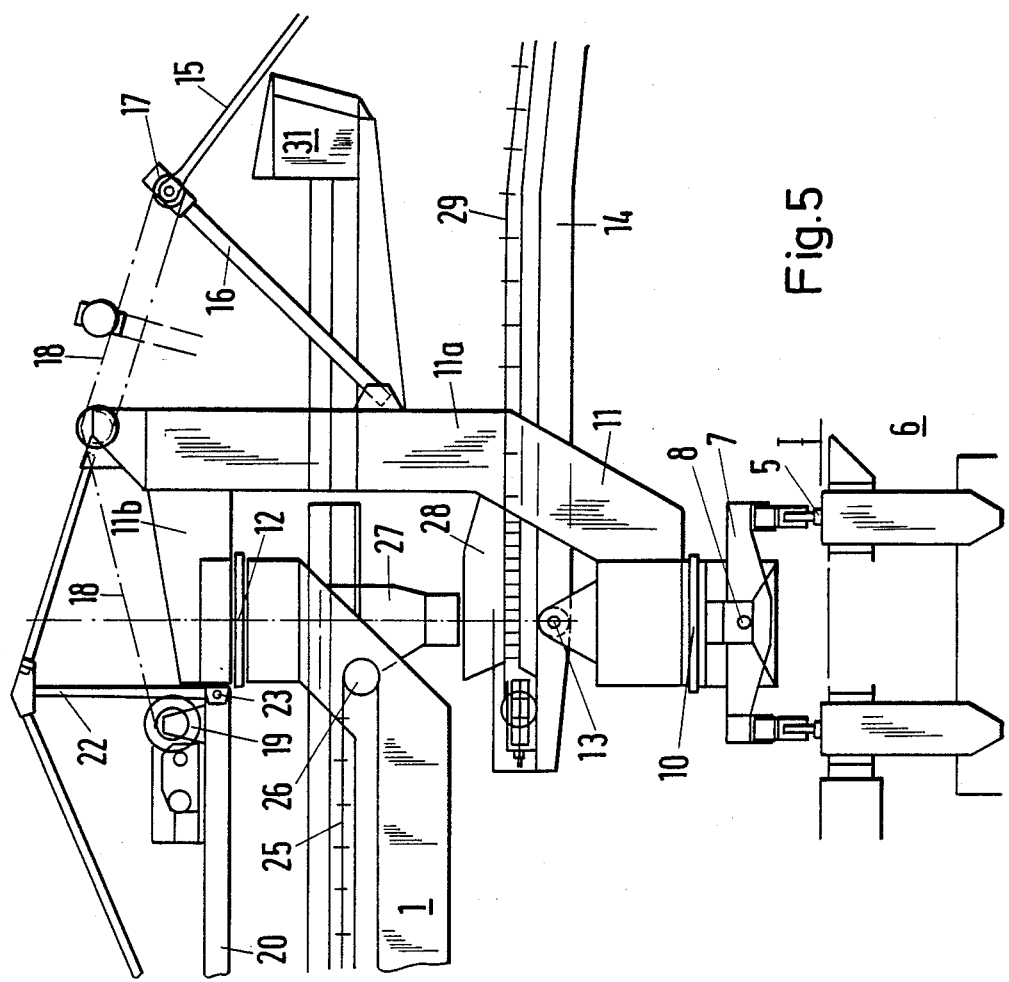
FIG. 5 illustrates detail B as indicated in FIG. 1 also on an enlarged scale.
Figure 4:
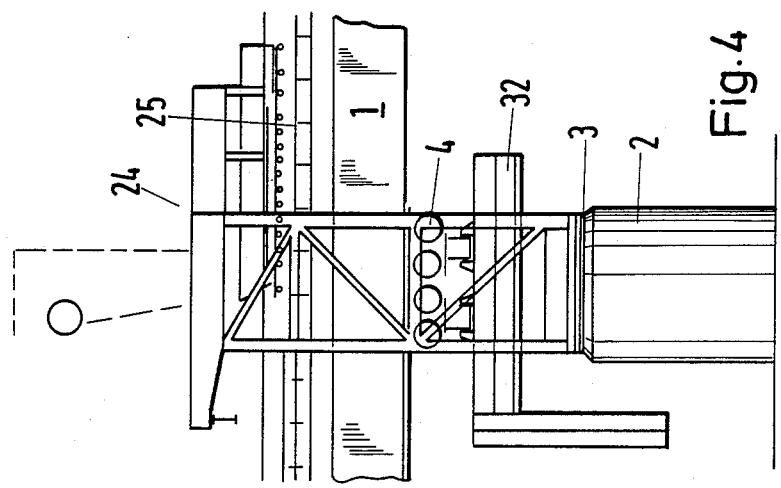
FIG. 4 illustrates detail A as indicated in FIG. 1 and on an enlarged scale.

A support carriage 7 runs on rails 5 along a pier wall 6. The one end of bridge 1 is mounted onto that carriage 7. By operation of rollers 4 the bridge 1 is movable in the direction towards and away from the pier 6 as the carriage 7 runs along the pier or quay. The carriage 7 runs on two parallely arranged and preferably straight rails 5. Whenever the bridge is at right angles to the rails, the tower 2 is in about the middle of the bridge. The carriage 7 is as shown in FIGS. 2 and 3 to be supported by means of longitudinal shaft means 8 on undercarriages 9 and 9a respectively being in the front and in the back of the vehicle.

The body of the vehicle or carriage 7 carries in its center a slewing track ring 10 or turntable like construction for rotation about a vertical axis, namely of a frame 11 which is thus mounted as shown in FIG. 1. The c-shaped carrier frame 11 carries another slewing ring track ring or turntable, 12, with a vertical axis of turning and by means of which the discharge or transfer end of the bridge is mounted directly to the frame 11 and indirectly to carriage 7. The pivot axis of the ring 12 is in this case situated above the ring 10 which is not mandatory but highly advantageous for reasons outlined below. Loading of pourable goods can be had from trucks, railroad cars, cranes etc. in the area of the tower 2. The transfer end of conveyer belt 25 is established by the deflection drum 30 right above a funnel 27 being situated between the rings 10 and 12.

The c-shaped frame 11 is basically constructed of two vertical posts 11a (one behind the other in FIG. 5). There is an upper transverse element constructed as a cantilever beam 11b and the c is completed by a relatively short lower transverse element 11c for mounting the slewing ring 10. This element 11c is also the support for a horizontal pendulum axis or shaft 13 above the lower turntable 10, which axis or shaft is provided for pivot mounting one end of a discharge and depositing device 14. This one end of this depositing device 14 is situated under the funnel 27 and thus receives whatever drops off conveyer belt 25. Most importantly, the transfer is independent from the angular position of bridge 1 and of device 14 in relation to the vertical axis of rings 10 and 12.

The depositing device 14 is of extended beam or beamlike construction with a depositing end 30 for a conveyer belt 29. The pendulum shaft 13 may be displaced laterally to one or the other side and for several meters as is shown specifically in the second example of FIG. 7. The depositing and placement device 14 is mounted further by means of a pivot lever 16 linked or hinged to the c-shaped carrier 11; a tension cable 15 holds the device 14 on lever 16.

The upper connect point of the cable 15, at the strut 16, provides additionally a journal support for a pulley 17 over which is run a cable 18 pertaining to a winch 19. This winch 19 is arranged on an outrigger arm or boom 20 for a counter weight 21 of a thrust mount structure 22. The boom or arm 20 of the tensioning mount 22 is mounted on the upper element 11b of the carrier frame under utilization of a horizontal pin or bolt 23.

The up-down inclination of the device 14 is changed through pulling or relaxing cable 18 by operation of the winch 19 whereby lever 16 is pivoted in a vertical plane, and through the cable 15, the device 14 is pivoted up and down.

Pourable goods to be loaded and reloaded are placed by means of the device 24 of general design onto the conveyer belt 25 of the bridge 1. The loading device 24 is arranged above the tower 2. The other transfer end of the belt is characterized by the deflection drum 26, and as the belt 25 loops around the drum 26 the pourable goods are poured into the funnel 27. The funnel pours the goods onto the conveyer belt 29 of the delivery and depositing equipment 14. Near the outer end of the device 14 the belt 29 loops around the drum 30 and the goods pour down from there e.g. onto or into a ship or any other receiving place.

The entire device is controlled by an operator manipulating a panel in a cabin 31. On loading a ship, the carriage 7 drives and runs along the rails 5 on quay 6 and drags along the bridge 1 under utilization of the c-shaped carrier 11. The bridge-plus-depositing device structure is capable of two independent but coaxial pivot motions. As the carriage 7 with frame 11 runs on rails 5 parallel to quay 6 (and a ship such as 33) the bridge end pivots by operation of slewing ring 12. At the same time the bridge pivots on tower 2 and the roller mounts 4 are provided for permitting the requisite longitudinal displacement of the bridge 1. The second turning motion alluded to above is independent from the carriage (7) portion but the depositing equipment 17 pivots on a vertical axis by virtue of the slewing track ring 10. This turning motion involves the frame 11 in its entirety as the device 14 extends between the two vertical posts 11a but owing to the coaxiality of 10 and 12 turning of frame 11 does not affect the position and orientation of bridge 1!

As stated, the carrier frame 11 has two support arms or posts 11a arranged in parallel and being the vertical component of the frame. The upper bar (beam) 11b is connected to the bridge 1 through the upper ring 12, the lower part 11c of carrier frame 11 is connected on to the carriage 7 by means of the ring 10. This double connection prevents the carrier frame 11 from tilting and makes it possible in cases actually to replace the double rail arrangement by a single one or monorail so that the horizontal shaft arrangement 8 of the carriage 7 will not be needed. Whenever the delivery depositing device and equipment 14 extends directly in the direction of bridge 1, the upper ring 12 will take up most of any tilting moment. If the depositing and delivery equipment and device 14 is more or less at right angles to bridge 1 then the tilting moment is primarily taken up by the ring 10. The rings 10 and 12 are therefore provided in addition for preventing tilting of the carriage 7 and of the frame 11!

As the carriage runs on the rail, the bridge is articulated to pivot around the tower 2 and it extends or retracts by rolling on rollers 4. On the other hand the depositing device 14 is separately and independently pivoted so that altogether a very large range is covered as is shown in FIG. 6. The circles 14a and 14a' together denote and indicate the total range within which the goods can be poured and unloaded. In the specific example shown in FIG. 7 to be described more fully below the carriage 7' for the c-frame 11 runs on a single rail 5 which is mounted on the pier or quay 6. The upper ring 12 by means of which the bridge 1 is mounted also here prevents any tilting of the monorail vehicle 7 together with the lower ring 10 for the delivery equipment 14.

FIG. 8 illustrates further that a pivot structure 34 arranged on the carriage 7' reaches into the ring 10 of frame 11 having a pendulum axis 13 for the depositing device and equipment 14 which is displaced laterally from the axis of rotation of ring 10, towards the outer end of the device 14. Therefore, the mounting for the pendulum axis and shaft 13 shown earlier is not necessary here; the movement of the various conveyer belts and the transfer of goods is not interfered with.

Turning now to the particulars of the embodiment shown in FIGS. 7-10, the bridge 1 is divided into an inner or principal bridge part 1a and a bridge end portion or secondary part 1b shown in these figures in a shortened version. An intermediate or supplemental bridge support 35 is shown in FIG. 9 on a larger scale. This intermediate support 35 provides supplemental bridge support in the area or zone of a hinged connection between the bridge parts 1a and 1b. The intermediate support 35 includes another vehicle 38 which runs on a rail 36 of quay 37 a little off the water line. The support 35 is provided with two slewing rings 39 and 40 which are interconnected through a length compensating lever 41. That lever is effective over entire bridge 1 as far as any requisite length compensation of concerned, being related to certain geometric aspects described more fully below. A support lever 42 extending from ring 40 carries the one end of the bridge portion 1a.

Bridge part 1a is additionally provided with a connecting piece 43 for juxtaposed hinges 44, as can be seen in FIG. 7. The bridge mount and hinge 44 in turn carries a support 45 for the secondary bridge part and the end portion 1b. This bridge part 1b is also supported by means of the rollers 4 on the tower 2. It can be seen in the top elevations of FIGS. 10 and 11 that these two bridge parts are angularly off in relation to each other by an angle of about 5 degrees. This pivoting or relative tilting between the bridge parts 1a and 1b is kept fairly small, the range is possibly even under 1 degree so that the operation of the conveyer belt 25 covering both bridge parts 1a and 1b is not interfered with. The conveyer belt runs over both bridge parts and runs the pourable goods to the funnel 27 in particular a depositing part 28 thereof for placement on the conveyer belt 29 of the device 14.

FIGS. 10 and 11 show not only the tilting of the bridge, in a top elevation, but the entire geometry of bridge movement and displacement is derivable from FIG. 10. The bridge 1b is supported by the tower 2 for turning and longitudinal displacement. The outer end of the bridge part 1a sits on carriage 7 which bears on a straight rail 5 of the pier 6. This way the bridge can be displaced by distance x under utilization of the support carriage 7 as shown in FIG. 10. The end portion of bridge part 1b projects beyond the tower 2. This end portion runs over the curved path or trace c. In the area of the pivot mount and hinge connection 44 both bridge parts bear on the rail 36 by means of the intermediate support 35 with carriage 3. The rail 36 should have a curved center portion 36a and straight ends 36b,c as shown in FIG. 10. It can thus be seen that the ends of rail 36 are directed towards the rail 5. In FIG. 10 the pivoted bridge is shown in FIG. 10 as a straight line. However, the hinge 44 is situated somewhat outside of the point of bending at the end of its straight displacement path y (see also FIG. 11).

Whenever the intermediate support 35 is arranged close to the tower 2, as is shown e.g. by b, and a rail 36' that rail should then run on a curve so that the hinge 44' being situated in the straight portion of the bridge sections 1a and 1b can yield. The disposition of the curve b is intentionally selected somewhat unfavorable in order to demonstrate that a distribution of the bridge length 1a and 1b which is not optimized results in a curved rail part b which upon replacement through curves and straight portions indicated in will lead to a very strong tilting of the sections 1a and 1b as shown in FIG. 11. The speeds of the carriages 7 and 38 will not be matched to each other. Therefore a desired point of tilting i.e. the location of the support rollers 44 is of advantage so that in fact the operation of the belt 25 is not interfered.

The inventive device for pouring goods can work also in the opposite direction. This means that conveyer belt 29 of the device 14 runs in opposite direction and will then be arranged underneath the upper ring gear 12 and will deliver the pourable goods to the top of the funnel 27, the placement device 28 will then load the goods on the conveyer 25, as before also in the opposite direction again the bridge is provided for tilting and the destination for the pourable goods is located in a fairly limited area of tower 2.

The invention is not limited to the embodiments described above but all changes and modifications thereof, not constituting departures from the spirit and scope of the invention, are intended to be included.

I claim:

1. Loading device including a bridge with a first conveyer belt, the device provided for delivering pourable goods to a particular destination comprising:
    tower means for pivot-mounting and supporting the bridge, said bridge pivoting about a vertical axis and being provided for longitudinally sliding on the tower means;

one end of the bridge being provided for discharge and transfer of goods from the first conveyer;

a support carriage for running on straight rail means along a quay or the like, the rail means not being in line with said tower means, the carriage having wheel means to provide additional support points for the bridge on the rail means;

a carrier frame from mounting said end of the bridge to the carriage; and a depositing device with extending structure being pivoted about a vertical axis in an area of said frame mounting, and receiving pourable goods from said first conveyer belt and delivering the goods for depositing by and at an end of said extended structure onto said particular destination.

2. Device as in claim 1, including a first slewing track ring for carriage fastening to the carrier frame;

a second slewing track ring for fastening the bridge to the carrier frame.

3. Device as in claim 1, the carrier frame being of overall C-shaped construction having two parallely extending vertical posts, a cantilever beam on top and a horizontal support part at the bottom of the parts, the bridge being pivotably or rotatably fastened to said cantilever beam, the carriage being rotatably fastened to the lower support part.

4. Device as in claim 1, a lever arm mounted on the carrier frame and having a counterweight;

cable and wire means connected to said extended structure and said lever arm for raising and lowering the depositing device.

5. Device as in claim 4, the extended structure being a boom held on the carrier frame by a second cable and a pivotal support arm, the cable of the cable and winch means connected and acting on said support arm.

6. Device as in claim 5, the boom being mounted on the carrier frame by means of a pendulum shaft.

7. Device as in claim 2, said first and second rings being coaxial, there being a funnel between the rings, the conveyer belt pouring goods into the funnel, the funnel depositing goods onto the depositing device, the depositing device having a conveyer belt.

8. Device as in claim 1, the support carriage having front and rear under carriages mounted on coaxial shafts.

9. Devices as in claim 8, there being two parallel rails.

10. Device as in claim 8, the under carriages constructed as monorail vehicles.

11. Device as in claim 1, said tower having a slewing track ring for pivot mounting the bridge, the bridge sliding on the ring by means of roller bearings.

12. Device as in claim 1, said bridge having a first and a second bridge part, the parts being hinged to each other at a location supported by further carriage means, there being additional rail means for the carriage means, between the rail on the quay means and the tower.

13. Device as in claim 12, said additional rail means having a central curved portion with oblique arms extending therefrom.

14. Device as in claim 12, said further carriage means having a slewing track ring and a length compensating lever.

* * * * *